US012779571B2

(12) United States Patent
Kubicek et al.

(10) Patent No.: US 12,779,571 B2

(45) Date of Patent: Nov. 3, 2026

(54) METAL TRANSFER CONTROLLED PULSED WELDING PROCESS

(71) Applicant: The ESAB Group, Inc., North Bethesda, MD (US)

(72) Inventors: Rastislav Kubicek, Gothenburg (SE); Karl Jakob Erik Lennartsson, Gothenburg (SE); Bo Daniel Lennartsson, Örebro (SE); Lars David Leif Juliusson, Västra Frölunda (SE)

(73) Assignee: THE ESAB GROUP, INC., North Bethesda, MD (US)

( * ) Notice: Subject to any disclaimer, the term of this patent is extended or adjusted under 35 U.S.C. 154(b) by 63 days.

(21) Appl. No.: 18/939,846

(22) Filed: Nov. 7, 2024

(65) Prior Publication Data

US 2026/0124694 A1 May 7, 2026

(51) Int. Cl.

*B23K 9/095* (2006.01)
*B23K 9/09* (2006.01)
*B23K 9/10* (2006.01)

(52) U.S. Cl.

CPC .............. *B23K 9/092* (2013.01); *B23K 9/095* (2013.01); *B23K 9/1093* (2013.01)

(58) Field of Classification Search

CPC ....... B23K 9/092; B23K 9/095; B23K 9/1093
See application file for complete search history.

(56) References Cited

U.S. PATENT DOCUMENTS

| | | |
|---|---|---|
| 4,594,498 A | 6/1986 | Ueguri et al. |
| 5,432,317 A | 7/1995 | Church |
| 5,495,091 A | 2/1996 | Tabata et al. |
| 5,726,419 A | 3/1998 | Tabata et al. |
| 6,008,470 A | 12/1999 | Zhang et al. |
| 6,013,896 A | 1/2000 | Zhang et al. |
| 6,025,573 A | 2/2000 | Stava |

(Continued)

FOREIGN PATENT DOCUMENTS

| | | |
|---|---|---|
| EP | 1193019 B1 | 4/2002 |
| EP | 3646978 B1 | 5/2020 |
| EP | 4015128 A1 | 6/2022 |

OTHER PUBLICATIONS

Extended European Search Report from the European Patent Office for European Patent Application No. 25213130.5 dated Apr. 14, 2026, 7 pages.

*Primary Examiner* — Rodolphe Andre Chabreyrie

(74) *Attorney, Agent, or Firm* — Edell, Shapiro & Finnan, LLC

(57) ABSTRACT

A method of controlling a pulsed welding process, in which an electrode tip of a consumable electrode is advanced toward a workpiece, comprises: generating a pulsed current waveform having repetitive cycles; supplying the pulsed current waveform to the electrode tip to strike an arc on the workpiece during each cycle, wherein a cycle of the repetitive cycles includes: a pulse forming period that includes a forming pulse to form a droplet at the electrode tip, wherein the forming pulse includes a first peak that has a first peak duration; and a pulse detachment period that includes a detachment pulse separated from the forming pulse and configured to transfer the droplet from the electrode tip to the workpiece, wherein the detachment pulse includes a second peak that has a second peak duration that is less than the first peak duration.

18 Claims, 7 Drawing Sheets

(56) References Cited

U.S. PATENT DOCUMENTS

| | | | |
|---|---|---|---|
| 6,037,554 A | 3/2000 | Innami et al. | |
| 6,384,376 B1 | 5/2002 | Plottier et al. | |
| 7,271,365 B2 | 9/2007 | Stava et al. | |
| 7,304,269 B2 | 12/2007 | Fulmer et al. | |
| 8,153,933 B2 | 4/2012 | Yamazaki et al. | |
| 8,203,099 B2 | 6/2012 | Peters et al. | |
| 8,242,410 B2 | 8/2012 | Peters | |
| 8,283,598 B2 | 10/2012 | Fulmer et al. | |
| 8,373,093 B2 | 2/2013 | Peters | |
| 8,692,157 B2 | 4/2014 | Daniel et al. | |
| 8,816,250 B2 | 8/2014 | Koshiishi et al. | |
| 8,937,267 B2 | 1/2015 | Peters | |
| 8,952,291 B2 | 2/2015 | Hillen et al. | |
| 8,993,927 B2 | 3/2015 | Peters | |
| 9,061,365 B2 | 6/2015 | Ueda et al. | |
| 9,095,929 B2 | 8/2015 | Peters | |
| 9,266,194 B2 | 2/2016 | Hillen et al. | |
| 9,393,635 B2 | 7/2016 | Peters et al. | |
| 9,415,458 B2 | 8/2016 | Doyle et al. | |
| 9,662,736 B2 | 5/2017 | Peters | |
| 9,895,760 B2 | 2/2018 | Peters | |
| 10,786,862 B2 | 9/2020 | Fujiwara | |
| 12,103,121 B2 * | 10/2024 | Feldhausen | B23K 9/173 |
| 2005/0211747 A1 | 9/2005 | Wang et al. | |
| 2008/0011727 A1 | 1/2008 | Peters | |
| 2010/0200553 A1 | 8/2010 | Yamazaki et al. | |
| 2015/0196969 A1 | 7/2015 | Peters | |
| 2015/0217404 A1 | 8/2015 | Peters | |
| 2020/0130087 A1 | 4/2020 | Fleming et al. | |
| 2021/0031290 A1 | 2/2021 | Matsuoka et al. | |
| 2023/0041907 A1 | 2/2023 | Noguchi et al. | |

* cited by examiner

METAL TRANSFER CONTROLLED PULSED WELDING PROCESS

TECHNICAL FIELD

The present disclosure relates to a pulsed welding process.

BACKGROUND

Pulsed Gas Metal Arc Welding (GMAW) including pulsed Metal Inert Gas (MIG) welding and Metal Active Gas (MAG) (MIG/MAG) welding involves supplying power in the form of current and voltage to a consumable wire electrode to form an electric arc between a tip of the wire electrode (i.e., the "electrode tip") and a workpiece on which melted welding material from the electrode tip is deposited, and which forms a weld when cooled. During the pulsed welding process, a welding power supply generates a pulsed current waveform and supplies the same to the electrode tip. Controlling melting characteristics of metal droplets at the electrode tip, and their transfer to the workpiece, to achieve consistent high-quality results across a wide range of welding conditions, presents a challenge. This is especially true given the indirect relationship between various parameters of the pulsed current waveform, droplet melt conditions, and the timing of droplet transfer.

DETAILED DESCRIPTION

Overview

In an embodiment, a method of controlling a pulsed welding process, in which an electrode tip of a consumable electrode is advanced toward a workpiece, comprises: generating a pulsed current waveform having repetitive cycles; supplying the pulsed current waveform to the electrode tip to strike an arc on the workpiece during each cycle, wherein a cycle of the repetitive cycles includes: a pulse forming period that includes a forming pulse to form a droplet at the electrode tip, wherein the forming pulse includes a first peak that has a first peak duration; and a pulse detachment period that includes a detachment pulse separated from the forming pulse and configured to transfer the droplet from the electrode tip to the workpiece, wherein the detachment pulse includes a second peak that has a second peak duration that is less than the first peak duration.

EXAMPLE EMBODIMENTS

Figure 1:
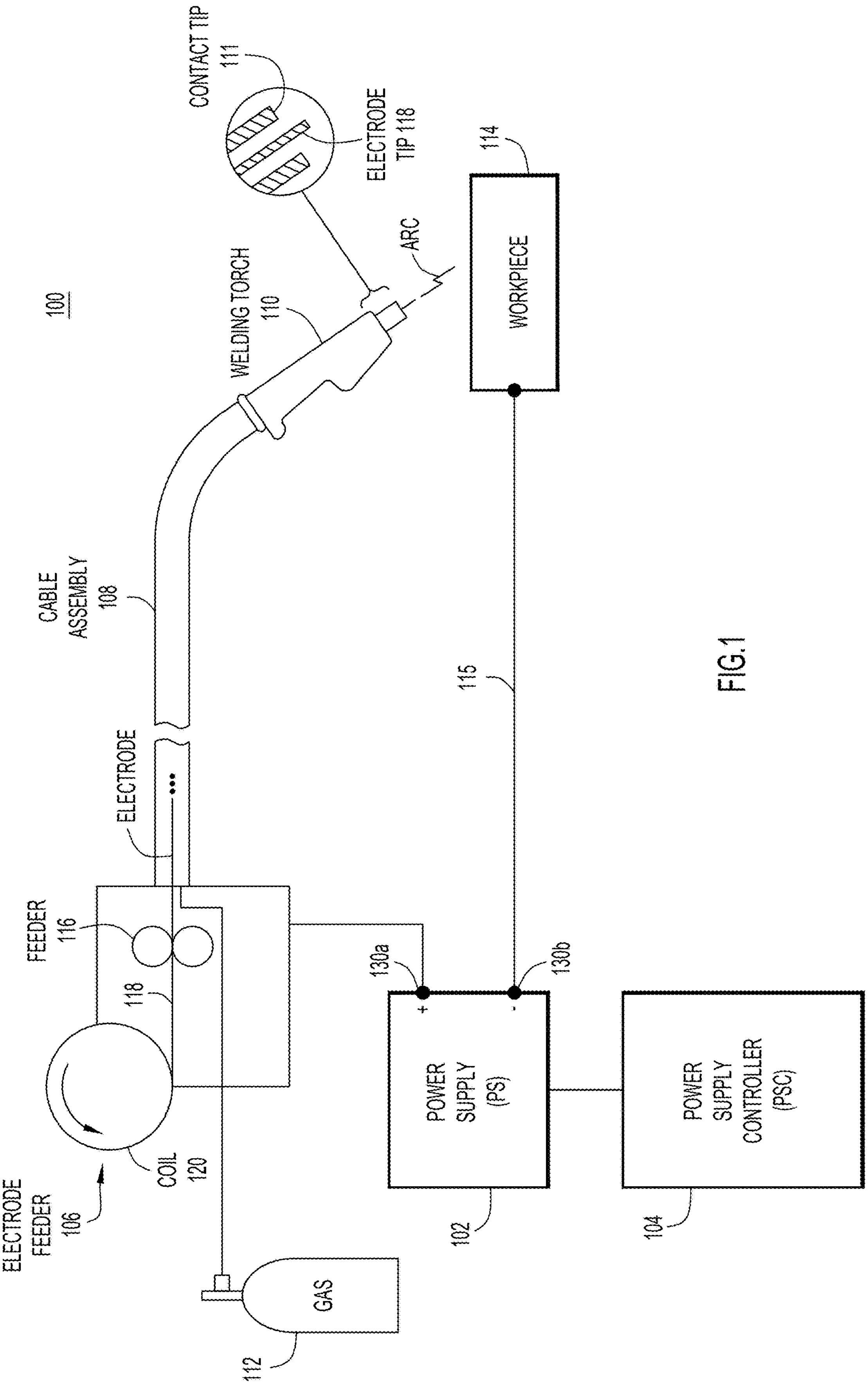
FIG. 1 is an illustration of an example welding system in which embodiments directed to controlling melting characteristics of metal transfer in a pulsed welding process may be implemented.

With reference to FIG. 1, there is an illustration of an example metal inert gas (MIG)/metal active gas (MAG) welding system 100, in which controlling melting characteristics of metal transfer in a pulsed welding process may be implemented. The embodiments are presented in the context of MIG/MAG welding by way of example only. It is understood that the embodiments may be employed generally in any known or hereafter developed welding environments, such as, but not limited to, tungsten inert gas (TIG) welding, flux cored arc welding (FCAW), shielded metal arc welding (SMAW) or stick welding, submerged arc welding (SAW), and so on. Welding system 100 includes: a power supply 102; a power supply controller (PSC) 104 coupled to and configured to control the power supply; an electrode feeder 106 coupled to the power supply; a cable assembly 108 coupled to the electrode feeder; a welding torch 110 (also referred to as a "welding gun") coupled to the cable assembly and having a sturdy metal contact tip 111 that extends from an end of the welding gun or torch; a gas container 112 coupled to the cable assembly; and a workpiece 114 coupled to the power supply through at least a return path/cable 115. In the ensuing description, the terms "weld" and "welding" are synonymous and interchangeable.

Electrode feeder 106 includes an electrode feeder 116 to feed an electrode from a coiled electrode 120 through cable assembly 108 and through contact tip 111 of welding torch 110, which is in electrical contact with the electrode. Under control of PSC 104, power supply 102 generates weld power that drives the welding process. In welding processes that involve a pulsed or periodic waveform, the weld power typically includes a series of weld current pulses. Power supply 102 provides the weld power from an output terminal 130*a* of the power supply to the electrode, through electrode feeder 116, cable assembly 108, and welding torch 110, while the cable assembly also delivers a shielding gas from gas container 112 to the welding torch. Return path/cable 115 provides an electrical return path from workpiece 114 to an input terminal 130*b* of power supply 102

During a welding process, an electrode tip 118 of the electrode is brought into near contact with workpiece 114, and the weld power (i.e., weld current and weld voltage) supplied by power supply 102 to the welding torch creates an arc between workpiece 114 and electrode tip 118 (also referred to as an "electrode stick") extending through the contact tip. To control the welding process, PSC 104 controls power supply 102 to generate the weld power (e.g., weld current) at a desired level for the welding process, based on feedback in the form of measurements of the weld current and weld voltage (e.g., arc voltage) supplied by the power supply to the welding process. The measurements may be produced by current and voltage sense points in power supply 102 and/or at sense points that are remote from the power supply, such as in cable assembly 108 or welding torch 110.

Figure 2:
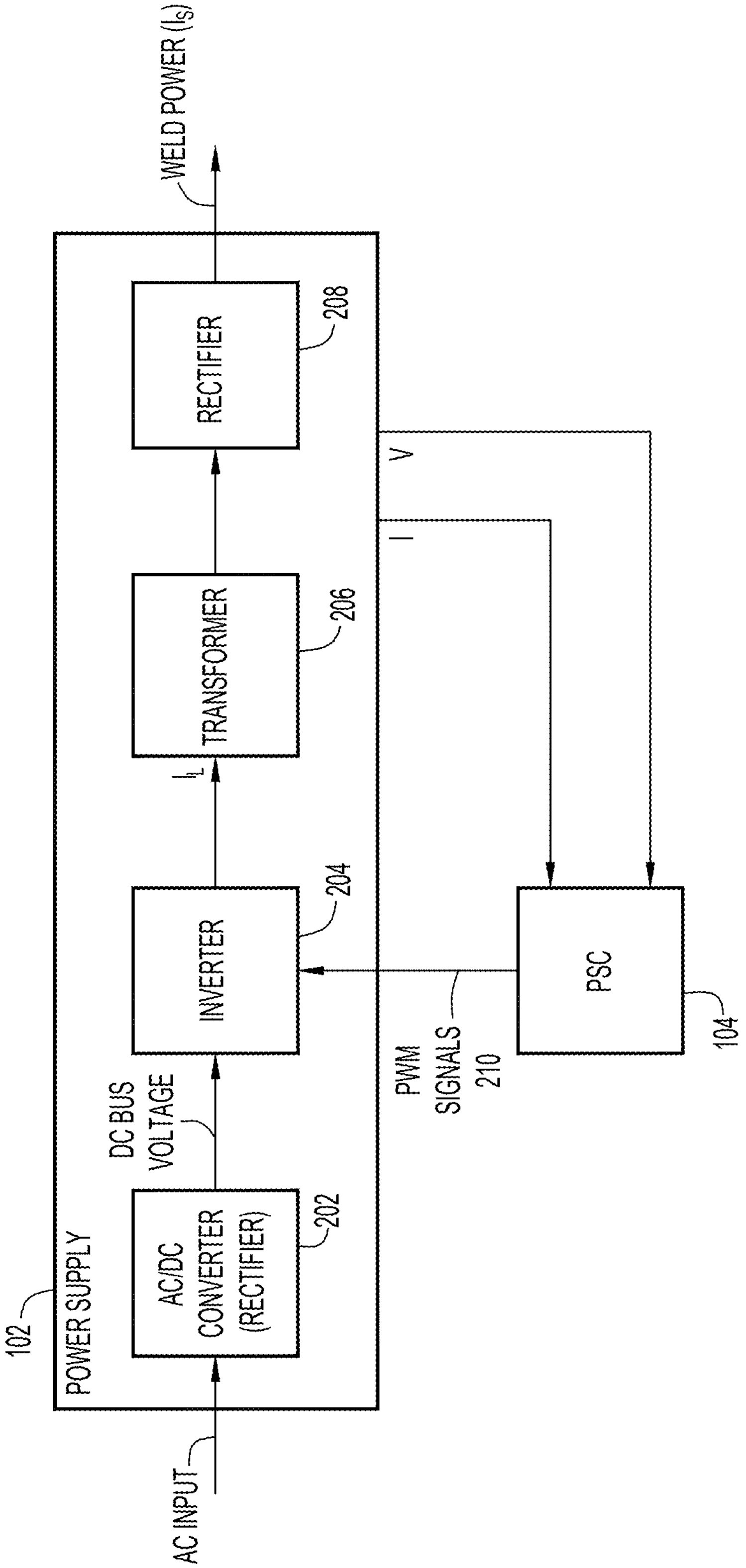
FIG. 2 is a block diagram of a power supply and a power supply controller (PSC) of the welding system, according to an example embodiment.

FIG. 2 is a block diagram of power supply 102 with PSC 104, according to an embodiment. Power supply 102 includes an AC/DC converter 202 to receive AC input power (e.g., from AC mains or a generator), a power inverter (referred to simply as an "inverter") 204, a high-frequency transformer 206, and a rectifier 208 coupled to one another. AC/DC converter 202 includes a diode rectifier to convert the AC input power to a constant, rectified DC voltage (also referred to as a DC "bus" voltage), and provide the DC bus voltage to an input of inverter 204. Under control of PSC 104, inverter 204, transformer 206, and rectifier 208 collectively operate as a weld process regulator to convert the DC bus voltage to a desired weld power supplied by power supply 102 for a welding process.

Inverter 204 comprises a set of high-speed semiconductor switching devices (i.e., power switches) that are pulse width modulated (i.e., switched on and off at a switching frequency) responsive to pulse width modulation (PWM) waveforms 210 (also referred to as "PWM signals"), generated by PSC 104 and applied to control terminals of the switching devices, to convert the DC bus voltage to an AC (power) signal or waveform including a voltage and a primary current $I_L$ that flows into transformer 206. Such operation is referred to as "PWM operation" of inverter 204. Example switching frequencies may be in a range from 1 kHz-100 kHz, although other switching frequencies above and below this range may be used. Inverter 204 supplies the AC signal to transformer 206. Transformer 206 converts the voltage and current of the AC signal from inverter 204 to a transformed AC signal having desired levels of a voltage and a secondary current $I_S$ for the welding process, and supplies the transformed AC signal to rectifier 208. Rectifier 208 rectifies the transformed AC signal to produce the weld power based on the secondary current $I_S$ and supplies the same to the welding process.

As shown in FIG. 2, power supply 102 includes a current sense point to provide to PSC 104 a sensed current I (i.e., a sensed weld current) that represents secondary current $I_S$ or primary current $I_L$, for example, produced by the power supply 102. Power supply 102 also includes a voltage sense point to provide to PSC 104 a sensed voltage V (i.e., a sensed weld voltage) representative of a voltage produced by the power supply (e.g., a voltage across the power supply terminals, the arc voltage, and the like). The sensed current and voltage represent current and voltage measurements (i.e., measured current and voltage) of the weld power, which provide real-time feedback from the welding process to PSC 104.

PSC 104 receives the current and voltage measurements. To control primary current $I_L$ (and correspondingly secondary current $I_S$) generated by power supply 102, PSC 104 controls or dynamically adjusts PWM waveforms 210 applied to inverter 204 based on desired or target settings (i.e., set points) for primary current (or secondary current), voltage, energy/power, and based on the current and/or voltage measurements from the welding process. For example, PSC 104 may increase an on-time of cycles of PWM waveforms 210 applied to inverter 204 to increase primary/secondary current $I_L/I_S$, and vice versa. In this way, PSC 104 implements a sample-based feedback control loop to control PWM waveforms 210 based on the current and voltage measurements.

Embodiments presented herein control melting of electrode tip 118 to form droplets and transfer of the droplets to workpiece 114 during a pulsed welding process. To achieve such control, power supply 102 generates a pulsed current waveform under control of PSC 104, and supplies the pulsed current waveform to electrode tip 118. The pulsed current waveform includes repetitive periods or cycles corresponding to repetitive cycles of the pulsed welding process. Each cycle strikes an arc on the workpiece. In contrast to a short arc welding process, the pulsed welding process does not intentionally short the electrode tip to the workpiece during each cycle. Each cycle includes a droplet forming period followed by a droplet detachment period. During the droplet forming period, a droplet forming pulse controls droplet formation at electrode tip 118. That is, the droplet forming pulse grows the droplet at electrode tip 118. During the droplet detachment period, a droplet detachment pulse transfers the droplet to workpiece 114. That is, the droplet detachment pulse sheers-off the droplet.

The droplet forming period (using the droplet forming pulse) and the droplet detachment period (using the droplet detachment pulse) control weld energy levels and timing of droplet formation and droplet detachment, respectively. To do this, PSC 104/power supply 102 control various parameters of the pulsed current waveform during the droplet forming period and the droplet detachment period to correspondingly control the weld energy levels. Example pulsed current waveforms generated and configured according to the embodiments are described below in connection with FIGS. 3-5. The pulsed current waveforms may be used for pulse welding of steel, stainless steel, aluminum, aluminum alloys (e.g., Al—Mg, Al—Si, and Al—Mg—Mn), nickel, nickel alloys, and the like, for example. In the ensuing description, the terms "droplet forming period," "droplet forming pulse," "droplet detachment period," and "droplet detachment pulse" may be referred to more simply as "forming period," "forming pulse," "detachment period" and "detachment pulse," respectively.

Figure 3:
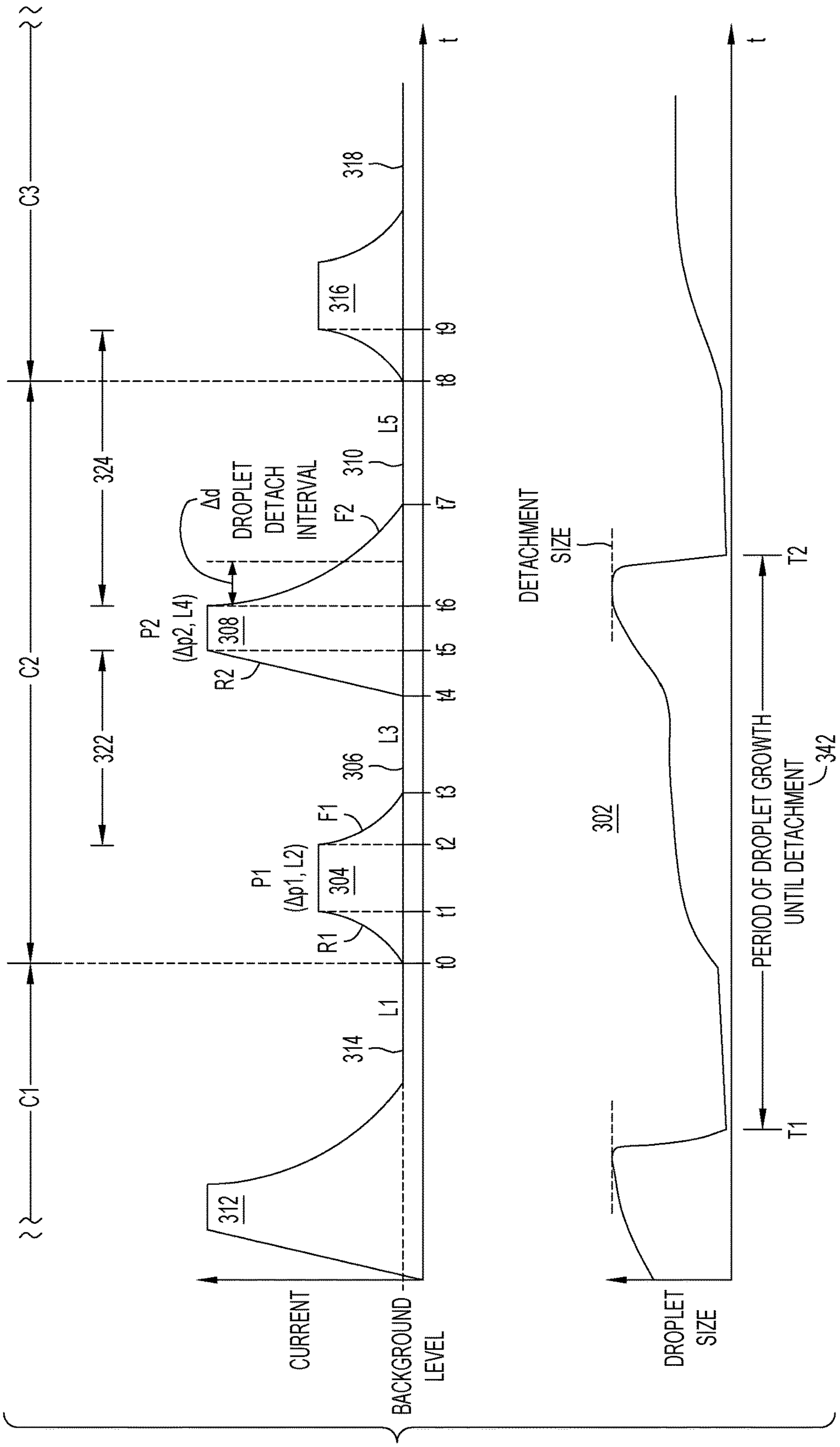
FIG. 3 shows an example pulsed current waveform generated by the power supply for the pulsed welding process, and an example plot of droplet-size growth over time as a result of the pulsed current waveform.

FIG. 3 includes a top plot of an example pulsed current waveform 300 generated by power supply 102 under control of PSC 104, for a pulsed welding process. FIG. 3 also includes a bottom plot 302 that presents example droplet-size growth over time as a result of pulsed current waveform 300. The top and bottom plots share a common time axis. Referring to the top plot, pulsed current waveform 300 includes successive periods or cycles C1, C2, and C3 for corresponding cycles of the pulsed welding process. Cycles C1, C2, and C3 are also referred to as previous, current, and next cycles. In FIG. 3, cycles C1 and C3 are only partially shown, while cycle C2 is shown in full. Each cycle of pulsed current waveform 300 includes two pulses to form a molten droplet (referred to simply as a "droplet") and transfer the droplet, as described below. Thus, pulsed current waveform 300 achieves a pulse-per-droplet transfer rate of two pulses per single droplet transferred.

Cycle C2 includes a forming pulse 304, an inter-pulse segment 306 (also referred to as a "first" inter-pulse segment) following the forming pulse, a detachment pulse 308 following the inter-pulse segment, and an inter-pulse segment 310 (also referred to as a "second" inter-pulse segment) following the detachment pulse. Forming pulse 304 and inter-pulse segment 306 collectively form a forming period of cycle C2. That is, the forming period includes forming pulse 304 and inter-pulse segment 306. Detachment pulse 308 and inter-pulse segment 310 collectively form a detachment period of cycle C2. That is, the detachment period includes detachment pulse 308 and inter-pulse segment 310.

FIG. 3 also shows a latter portion of (previous) cycle C1 that includes a detachment pulse 312 and an inter-pulse segment 314 that immediately precedes forming pulse 304 of cycle C1. FIG. 3 also shows an early portion of cycle C3 that includes a forming pulse 316 followed by an inter-pulse period 318. In an alternative arrangement, the boundaries of the cycles may be shifted. For example, a forming period may include inter-pulse segment 314 followed by forming pulse 304, and a detachment period may include inter-pulse segment 306 followed by detachment pulse 308.

Focusing on cycle C2, forming pulse 304 of cycle C2 occurs after detachment pulse 312 of cycle C1 has transferred a previously formed droplet to workpiece 114. Forming pulse 304 forms a new droplet on electrode tip 118. In the example, forming pulse 304 is a relatively low-power, long-duration pulse aimed at prolonging droplet formation time, postponing/suppressing droplet detachment, and providing enough time for the droplet to form (at the electrode tip) into a well-coagulated round shape that has additional volume of liquid metal, optimal surface tension, and a relatively large size. Forming pulse 304 includes a leading or rising edge R1 from t0 to t1 (i.e., a rising edge duration=t1−t0), a peak P1 from t1 to t2 (i.e., a peak duration Δp1=t2−t1), and a trailing or falling edge F1 from t2 to t3 (i.e., a falling edge duration=t3−t2).

In terms of current levels, rising edge R1 rises from an inter-pulse current level L1 of inter-pulse segment 314 to a peak current level L2 of peak P1, such that L1<L2. In the ensuing description, the term "current level" may be referred to simply as "level." In the example of FIG. 3, inter-pulse current level L1 is a non-zero background current level. The background current level may be the lowest current level that is sufficiently high (i.e., high enough) to maintain an existing arc, but insufficiently high (i.e., too low) to sheer-off the droplet. Peak current level L2 remains constant (i.e. flat) for the duration of the peak.

Falling edge F1 falls from peak current level L2 to an inter-pulse current level L3 of inter-pulse segment 306, such that L3<L2. In the example, inter-pulse current level L3 is the background current level. Inter-pulse segment 306 has a duration from t3 to t4 and maintains inter-pulse current level L3 across the duration. The current levels and durations of falling edge F1 and inter-pulse segment 306 collectively control the growth of the droplet (i.e., droplet growth) and act as a "safety" to prevent an undesired or too early detachment of the droplet before, and during, detachment pulse 308.

Detachment pulse 308 detaches or "sheers-off" the droplet formed by forming pulse 304 from electrode tip 118, which results in the transfer of the droplet to workpiece 114. In the example, detachment pulse 308 is a relatively high-power, short-duration pulse aimed at detaching the droplet with an optimal balance of forces acting simultaneously during detachment, to provide a dominant radial electromagnetic force. In the example, forming pulse 304 has less power (e.g., a lower current level) and a greater duration than detachment pulse 308. Detachment pulse 308 includes a rising edge R2 from t4 to t5 (i.e., rising edge duration=t5−t4), a peak P2 from t5 to t6 (i.e., a peak duration Δp2=t6−t5), and a falling edge F2 from t6 to t7 (i.e., a falling edge duration=t7−t6). Rising edge R2 is steeper than rising edge R1 and its duration is less than the duration of rising edge R1. In the example, duration Δp1 of peak P1 is less than duration Δp2 of peak P2. Also, the duration of falling edge F1 is greater than the duration of each of rising edge R2 and falling edge F2.

In terms of current levels, rising edge R2 rises from inter-pulse current level L3 to a peak current level L4 of peak P2, such that L3<L4. Peak current level L4 remains constant (i.e. flat) for the duration of the peak. Falling edge F2 falls from peak current level L4 to an inter-pulse current level L5 of inter-pulse segment 310, such that L5<L4. In the example, inter-pulse current level L5 is the background current level. Typically, the droplet detaches from electrode tip 118 during a detachment interval Δd of falling edge F2. Inter-pulse segment 310 has a duration from t7 to t8 and maintains current level L5 across the duration. At the end of inter-pulse segment 310, forming pulse 316 of cycle C3 begins, and the above described process repeats.

Pulsed current waveform 300 establishes two peak-to-peak (P2P) durations (also referred to as "pulse-to-pulse durations") per cycle. The two P2P durations include a first P2P duration 322 that extends from an end of peak P1 (i.e., t2) to a start of peak P2 (i.e., t5). That is, P2P duration 322=t5−t2. The two P2P durations include a second P2P duration 324 that extends from an end of peak P2 (i.e., t6) to a start of a peak of forming pulse 316 (i.e., t9). That is, P2P duration 324=t9−t6. In an alternative, the two P2P durations may be measured/extend between respective starts of the successive pulses, e.g., from t1 to t5 and from t5 to t9, for example. In the example, P2P duration 322 is less than P2P duration 324. In another example, P2P duration 322 is greater than P2P duration 324. In yet another example, P2P durations 322 and 324 are equal to each other.

Bottom plot 302 shows the droplet-size growth over time that results from pulsed current waveform 300. A previous droplet detaches at T1 responsive to detachment pulse 312 of cycle C1. Starting at T1, the droplet to be detached in cycle C2 grows over a droplet-growth period 342, until the droplet detaches at T2. As shown in the top and bottom plots, forming pulse 304 and inter-pulse segment 306 grow the droplet slowly over time and avoid detachment, while detachment pulse 308 grows the droplet more quickly, and then initiates detachment.

Over each cycle, PSC 104 and power supply 102 together perform weld energy level monitoring and control (collectively referred to as "energy level control") to ensure that pulsed current waveform 300 delivers desired (weld) energy levels to electrode tip 118 during the forming period (and forming pulse) and the detachment period (and detachment pulse). In an example, PSC 104 (i) integrates the power P (e.g., P=sensed current level·sensed voltage level) supplied by power supply 102 over a time interval (e.g., one or more pulse and/or inter-pulse segment durations), to produce a computed energy level for the time interval, (ii) compares the computed energy level to a desired energy level for the time interval, and (iii) based on a result of the compare, causes power supply 102 to adjust the waveform parameters of pulsed current waveform 300 (e.g., the pulse and/or inter-pulse segment duration(s) and current level(s)) to ensure that the (adjusted) pulsed current waveform delivers the desired energy level to electrode tip 118. In various examples, the energy level control may compute energy levels for forming pulse 304, inter-pulse segment 306, detachment pulse 308, inter-pulse segment 310, the forming period, the detachment period, compare the computed energies to corresponding desired energies, and adjust the waveform parameters (e.g., increase and decrease durations and current levels) accordingly to achieve the desired energy levels.

In an example, the energy level control controls pulsed current waveform 300 and the corresponding weld voltage to deliver to electrode tip 118 a constant energy level across the forming period and the detachment period, i.e., such that the forming period and the detachment period convey equal energy levels. To this end, forming pulse 304 and detachment pulse 308 may be configured to have/convey equal energy levels, for example. In this case, the power of forming pulse 304 may be less than the power of detachment pulse 308 (e.g., L2<L4), while the duration of peak P1 may be greater than the duration of peak P2 (e.g., Δp1>Δp2), for example; the overall effect being to convey an equal energy level in each pulse.

In another example, the energy level of the forming period (and forming pulse 304) differs from the energy level of the detachment period (and detachment pulse 308). For example, the energy level of the forming period (and forming pulse 304) may be greater than the energy level of the detachment period (and detachment pulse 308). Alternatively, the energy level of the forming period (and forming pulse 304) may be less than the energy level of the detachment period (and detachment pulse 308).

Figure 4:
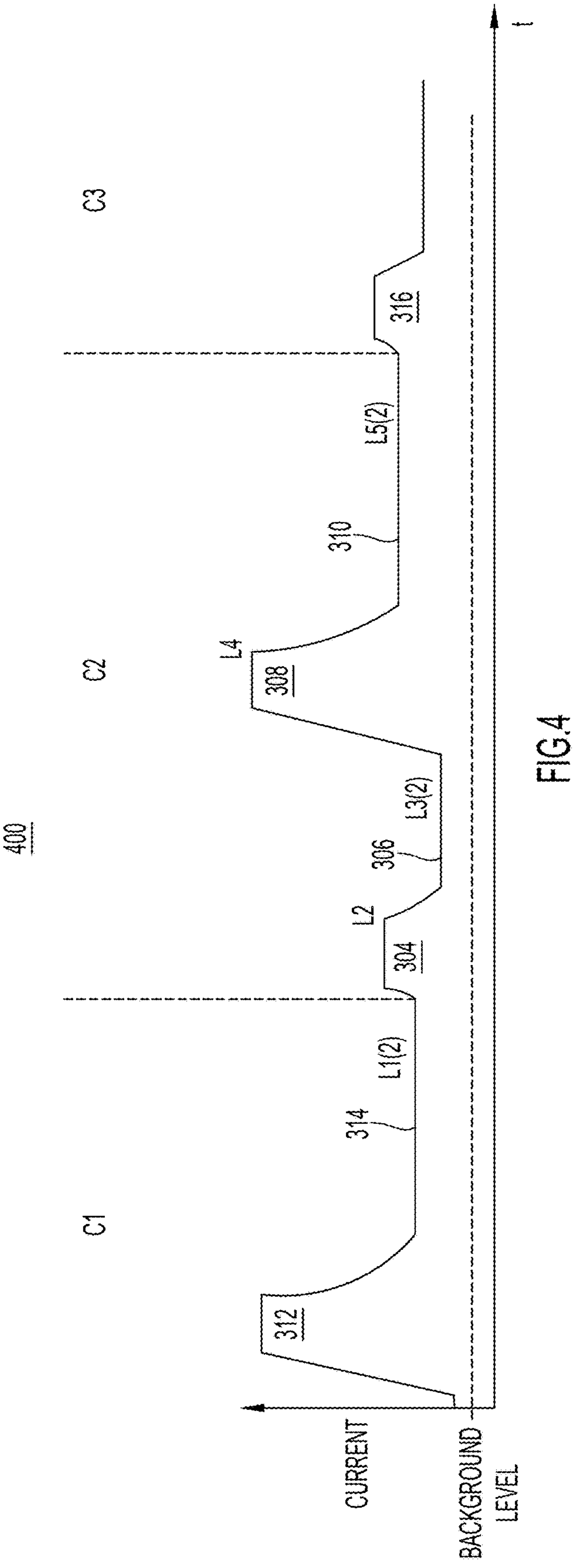
FIG. 4 shows another example pulsed current waveform for the pulsed welding process.

FIG. 4 shows another example pulsed current waveform 400 for a pulsed welding process. Pulsed current waveform 400 is similar to pulsed current waveform 300, except that some of the current levels of pulsed current waveform 400 differ from corresponding current levels of pulsed current waveform 300. Specifically, inter-pulse segments 314, 306, and 310 of pulsed current waveform 400 have respective current levels L1(2), L3(2), and L5(2) that are each greater than the background current level, and each less than both the peak current levels. That is, forming pulse 304 and detachment pulse 308 each rise from and fall to "intermediate" current levels. An intermediate current level is greater than the background current level, but less than both peak current levels. In the example, current level L3(2) of inter-pulse segment 306 differs from current level L5(2) of inter-pulse segment 310; specifically, L3(2)<L5(2). In another example (not shown), L3(2)>L5(2). In yet another example, L3(2) and L5(2) do not differ (i.e., L3(2)=L5(2)).

In other examples (not shown), (i) current level L3(2) is the background current level and current level L5 is an intermediate current level, or (ii) current level L3(2) is an intermediate current level and current level L5 is the background current level.

Figure 5:
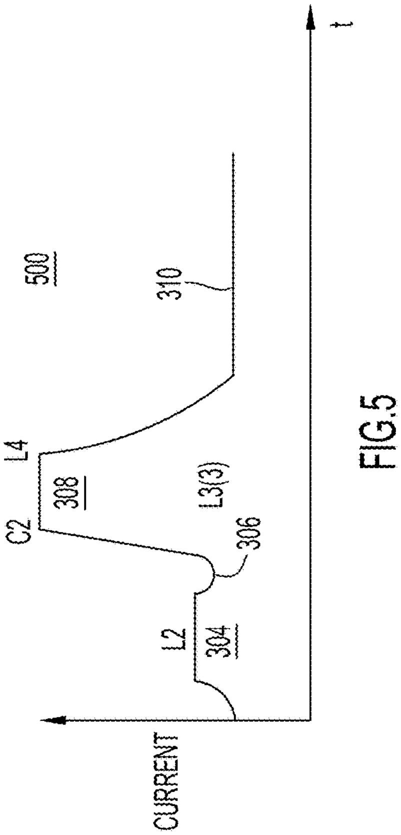
FIG. 5 shows yet another example pulsed current waveform for the pulsed welding process.

FIG. 5 shows an example pulsed current waveform 500 for a pulsed welding process. Pulsed current waveform 500 is similar to pulsed current waveform 400, except for the following difference. Pulsed current waveform 500 reduces the duration and a current level L3(3) of inter-pulse segment 306 to a momentary dip to an intermediate level (e.g., approximating a parabolic dip or nadir) separating forming pulse 304 and detachment pulse 308 (e.g., separating the peaks of the two pulses).

Figure 6:
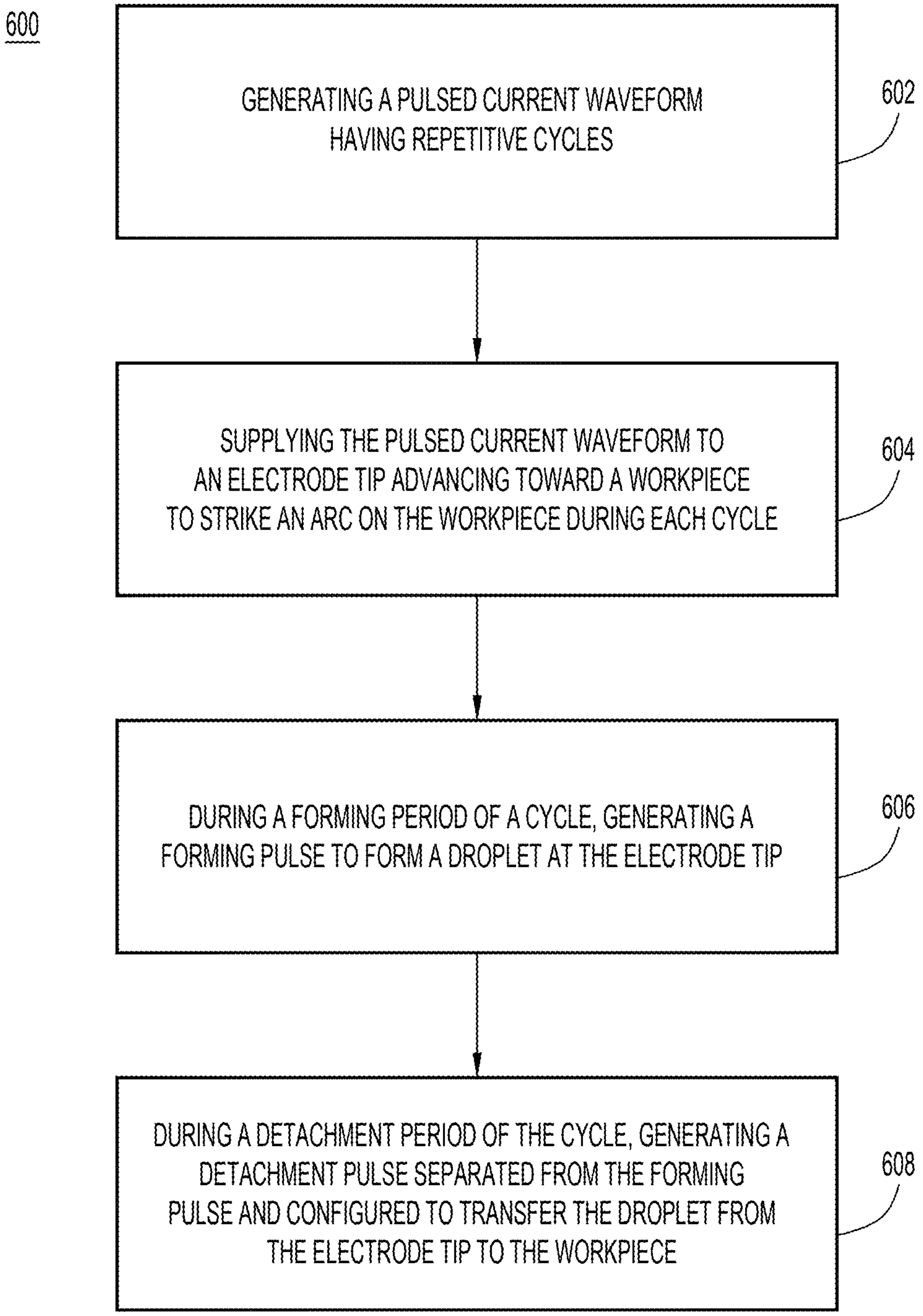
FIG. 6 is a flowchart of an example method of controlling melting characteristics of metal transfer in the pulsed welding process performed by the welding system.

FIG. 6 is a flowchart of example method 600 of controlling melting characteristics of metal transfer in a pulsed welding process performed by welding system 100. Method 600 is performed while welding system 100 advances electrode tip 118 of the consumable electrode toward workpiece 114. The description of method 600 refers to a "current level" as simply a "level."

At 602, PSC 104 controls power supply 102 to generate weld power including a pulsed current waveform having repetitive cycles corresponding to cycles of the pulsed welding process. The weld power includes a weld voltage corresponding to the pulsed current waveform.

At 604, power supply 102 supplies the weld power including the pulsed current waveform to electrode tip 118 to strike an arc on workpiece 114 during each cycle.

At 606, power supply 102 generates a forming period of a cycle of the pulsed current waveform. The forming period includes a forming pulse to form a droplet at the electrode tip. The forming pulse includes a first peak that has a first peak duration and a first peak level. The forming period may further include a first inter-pulse segment following the forming pulse.

At 608, power supply 102 generates a detachment period of the cycle. The detachment period includes a detachment pulse time-separated from the forming pulse (e.g., separated by the first inter-pulse segment) and configured to transfer the droplet from electrode tip 118 to the workpiece 114. The detachment pulse includes a second peak that has a second peak duration and a second peak level. The detachment period may include a second inter-pulse period following the detachment pulse.

The first peak level may differ from the second peak level. For example, the first peak level may be less than the second peak level. The first peak duration may differ from the second peak duration. For example, the first peak duration may be greater than the second peak duration.

Power supply 102 generates a next cycle following the cycle. The next cycle includes a next forming pulse that has a third peak level. A first peak-to-peak duration between the first peak and the second peak differs from a second peak-to-peak duration between the second peak and the third peak.

Figure 7:
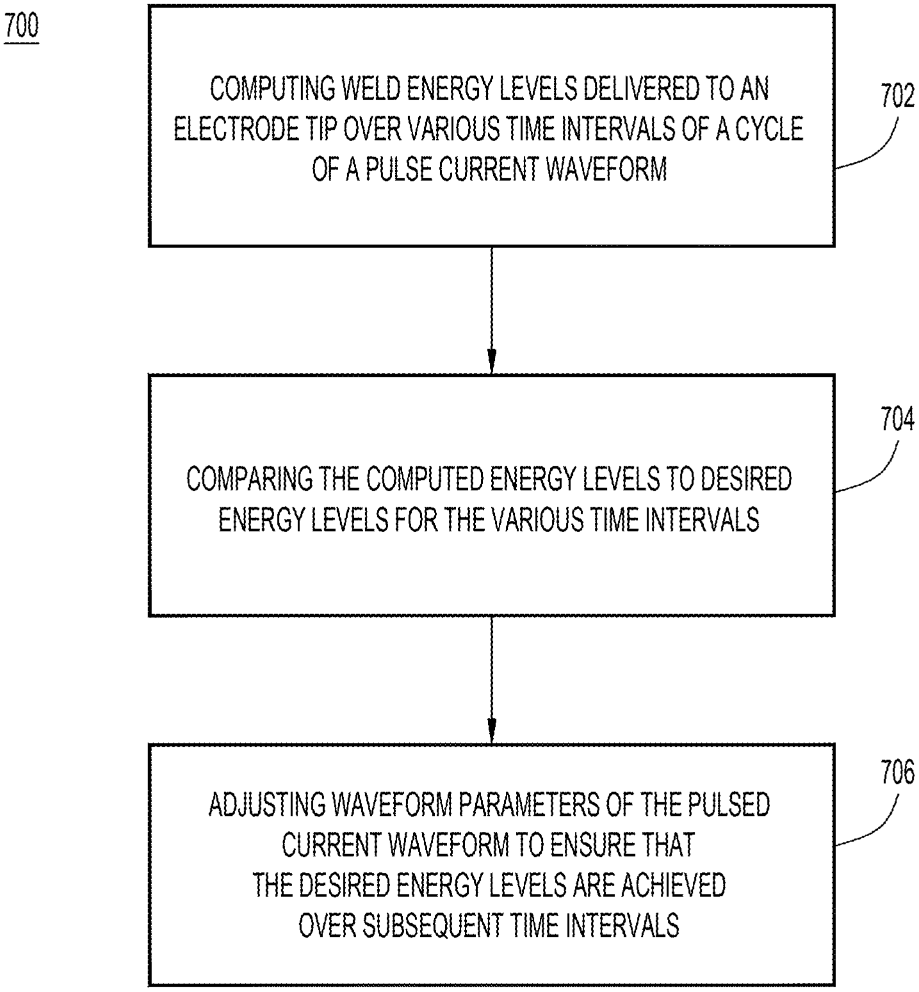
FIG. 7 is a flowchart of an example method of weld energy level control implemented over a cycle of the pulsed current waveform.

FIG. 7 is a flowchart of an example method 700 of weld energy level control implemented over a cycle of the pulsed current waveform.

At 702, PSC 104 computes weld energy levels delivered to electrode tip 118 over various time intervals of the cycle.

At 704, PSC 104 compares the computed energy levels to desired energy levels for the various time intervals.

At 706, PSC 104 controls power supply 102 to adjust waveform parameters of the pulsed current waveform to ensure that the desired energy levels are achieved over subsequent time intervals. In one example, power supply 102 configures the waveform parameters such that the forming pulse and the detachment pulse deliver an equal energy level to electrode tip 118.

Figure 8:
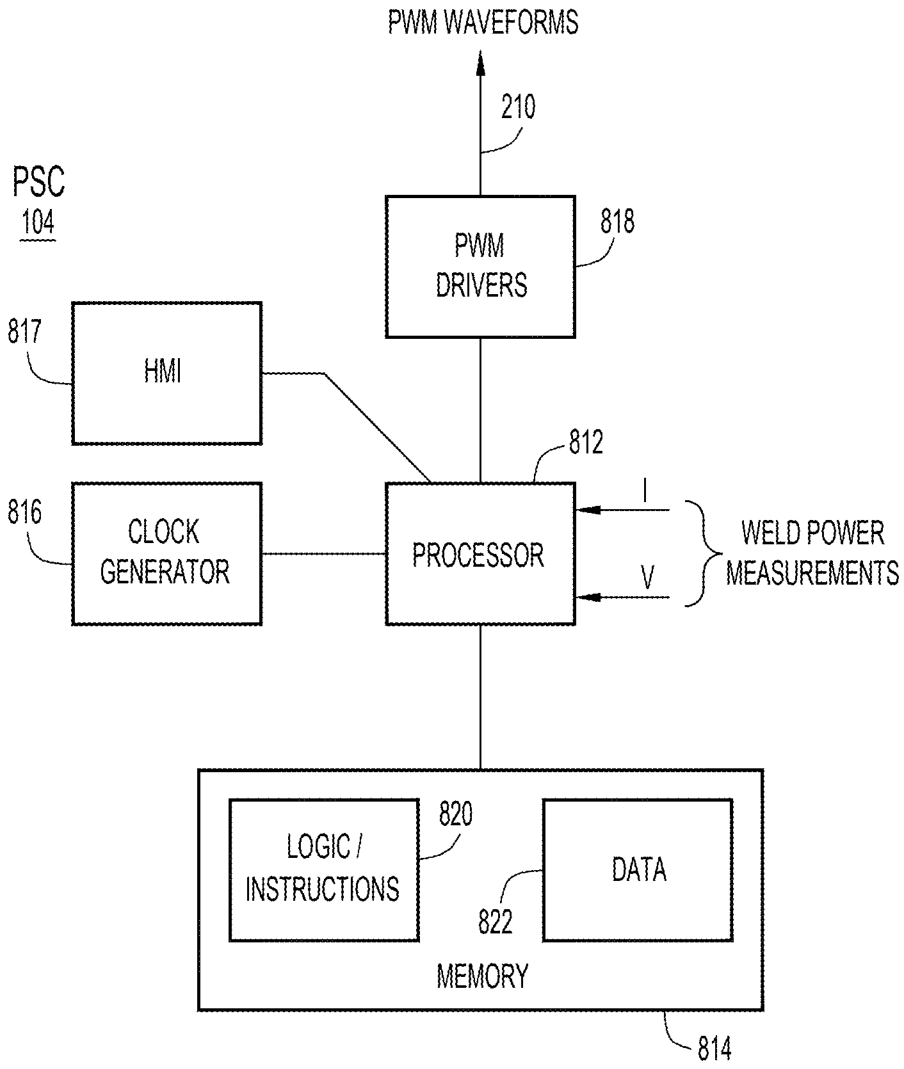
FIG. 8 is a diagram of the PSC in accordance with an embodiment.

With reference to FIG. 8, there is a block diagram of an example PSC (also referred to as a "controller") 104. PSC 104 includes a processor 812 (e.g., a microcontroller) (which may be implemented in hardware, software, or a combination thereof), a memory 814, a clock generator 816, a human machine interface (HMI) 817, and PWM drivers 818 coupled with each other. HMI 817 may include a display to present information, an alphanumeric keypad through which an operator may enter information, and switches or press buttons (e.g., an ON/OFF user switch and the like) through which the operator may interact with welding system 100. PSC 104 receives sensed voltage and current (i.e., voltage and current measurements), and weld power settings, and generates PWM waveforms 210 to control the current and voltage waveforms produced by power supply 102 responsive to the PWM signals. Memory 814 stores non-transitory computer readable program instructions/logic instructions 820 that, when executed by processor 812, cause the controller to perform the operations described herein. Memory 814 also stores data 822 used and produced by processor 812. Clock generator 816 generates clocks and timing signals used to drive other components of PSC 104. In embodiments, components of PSC 104 may include electronic circuitry such as, for example, programmable logic circuitry, field-programmable gate arrays (FPGA), programmable logic arrays (PLA), a general processor, and/or a digital signal processor (DSP) configured to execute the computer readable program instructions, which may include microcode, firmware, and so on.

In some aspects, the techniques described herein relate to a method of controlling a pulsed welding process in which an electrode tip of a consumable electrode is advanced toward a workpiece, including: generating a pulsed current waveform having repetitive cycles; supplying the pulsed current waveform to the electrode tip to strike an arc on the workpiece during each cycle, wherein a cycle of the repetitive cycles includes: a forming period that includes a forming pulse to form a droplet at the electrode tip, wherein the forming pulse includes a first peak that has a first peak duration; and a detachment period that includes a detachment pulse separated from the forming pulse and configured to transfer the droplet from the electrode tip to the workpiece, wherein the detachment pulse includes a second peak that has a second peak duration that is less than the first peak duration.

In some aspects, the techniques described herein relate to a method, wherein: the first peak has a first peak level and the second peak has a second peak level that is greater than the first peak level.

In some aspects, the techniques described herein relate to a method, wherein the forming period further includes: a first inter-pulse segment between the forming pulse and the detachment pulse, wherein the first inter-pulse segment has a first inter-pulse level that is less than each of a first peak level of the forming pulse and a second peak level of the detachment pulse.

In some aspects, the techniques described herein relate to a method, wherein: the first inter-pulse level is a background level.

In some aspects, the techniques described herein relate to a method, wherein: the first inter-pulse level is greater than a background level.

In some aspects, the techniques described herein relate to a method, wherein the detachment period includes: a second inter-pulse segment following the detachment pulse and that has a second inter-pulse level that is less than both the first peak level and the second peak level.

In some aspects, the techniques described herein relate to a method, wherein: the first inter-pulse level and the second inter-pulse level differ from each other.

In some aspects, the techniques described herein relate to a method, wherein: a next cycle following the cycle includes a next forming pulse that has a third peak; and a first peak-to-peak duration between the first peak and the second peak differs from a second peak-to-peak duration between the second peak and the third peak.

In some aspects, the techniques described herein relate to a method, further including: controlling the forming pulse and the detachment pulse to deliver equal energy levels to the electrode tip in the cycle.

In some aspects, the techniques described herein relate to a method, wherein: the first peak duration is greater than the second peak duration; and the first peak has a first peak level and the second peak has a second peak level that is greater than the first peak level.

In some aspects, the techniques described herein relate to a method, wherein: the pulsed welding process is performed without intentionally shorting the electrode tip to the workpiece during each cycle.

In some aspects, the techniques described herein relate to a method, wherein: the detachment pulse includes a first rising edge, the first peak, and a first falling edge during which the droplet detaches from the electrode tip.

In some aspects, the techniques described herein relate to a method, wherein: the forming pulse includes a first rising edge, the first peak, and a first falling edge; and the detachment pulse includes a second rising edge, the second peak, and a second falling edge during which the droplet detaches from the electrode tip, wherein the first falling edge has a greater duration than each of the second rising edge and the second falling edge.

In some aspects, the techniques described herein relate to a welding system including: a power supply; and a controller to control the power supply during a pulsed welding process by causing the power supply to supply, to an electrode tip of a consumable electrode configured to advance toward a workpiece, a pulsed current waveform having repetitive cycles to strike an arc on the workpiece during each cycle, wherein a cycle of the repetitive cycles includes: a forming period that includes a forming pulse to form a droplet at the electrode tip, wherein the forming pulse includes a first peak that has a first peak duration; and a detachment period that includes a detachment pulse separated from the forming pulse and configured to transfer the droplet from the electrode tip to the workpiece, wherein the detachment pulse includes a second peak that has a second peak duration that is less than the first peak duration.

In some aspects, the techniques described herein relate to a welding system, wherein: the first peak has a first peak level and the second peak has a second peak level that is greater than the first peak level.

In some aspects, the techniques described herein relate to a welding system, wherein the forming period further includes: a first inter-pulse segment between the forming pulse and the detachment pulse, wherein the first inter-pulse segment has a first inter-pulse level that is less than each of a first peak level of the forming pulse and a second peak level of the detachment pulse.

In some aspects, the techniques described herein relate to a welding system, wherein: the first inter-pulse level is a background level.

In some aspects, the techniques described herein relate to a welding system, wherein: the first inter-pulse level is greater than a background level.

In some aspects, the techniques described herein relate to a welding system, wherein the detachment period includes: a second inter-pulse segment following the detachment pulse and that has a second inter-pulse level that is less than both the first peak level and the second peak level.

In some aspects, the techniques described herein relate to a welding system, wherein: the first inter-pulse level and the second inter-pulse level differ from each other.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling a pulsed welding process in which an electrode tip of a consumable electrode is advanced toward a workpiece, comprising:

generating a pulsed current waveform having repetitive cycles; and supplying the pulsed current waveform to the electrode tip to strike an arc on the workpiece during each cycle, wherein a cycle of the repetitive cycles includes:

a forming period that includes a forming pulse to form a droplet at the electrode tip, wherein the forming pulse includes a first peak that has a first rising edge, a first peak duration, and a first falling edge; and a detachment period that includes a detachment pulse separated from the forming pulse and configured to transfer the droplet from the electrode tip to the workpiece, wherein the detachment pulse includes a second rising edge, a second peak that has a second peak duration that is less than the first peak duration, and a second falling edge during which the droplet detaches from the electrode tip, wherein the first falling edge has a greater duration than each of the second rising edge and the second falling edge.

2. The method of claim 1, wherein:

the first peak has a first peak level and the second peak has a second peak level that is greater than the first peak level.

3. The method of claim 1, wherein the forming period further includes:

a first inter-pulse segment between the forming pulse and the detachment pulse, wherein the first inter-pulse segment has a first inter-pulse level that is less than each of a first peak level of the forming pulse and a second peak level of the detachment pulse.

4. The method of claim 3, wherein:

the first inter-pulse level is a background level.

5. The method of claim 3, wherein:

the first inter-pulse level is greater than a background level.

6. The method of claim 3, wherein the detachment period includes:

a second inter-pulse segment following the detachment pulse and that has a second inter-pulse level that is less than both the first peak level and the second peak level.

7. The method of claim 6, wherein:

the first inter-pulse level and the second inter-pulse level differ from each other.

8. The method of claim 3, wherein:

a next cycle following the cycle includes a next forming pulse that has a third peak; and a first peak-to-peak duration between the first peak and the second peak differs from a second peak-to-peak duration between the second peak and the third peak.

9. The method of claim 1, further comprising:

controlling the forming pulse and the detachment pulse such that an equal energy level is delivered to the electrode tip by each of the forming pulse and the detachment pulse in the cycle.

10. The method of claim 1, wherein:

the first peak duration is greater than the second peak duration; and the first peak has a first peak level and the second peak has a second peak level that is greater than the first peak level.

11. The method of claim 1, wherein:

the pulsed welding process is performed without shorting the electrode tip to the workpiece during each cycle.

12. A welding system comprising:

a power supply; and a controller to control the power supply during a pulsed welding process by causing the power supply to supply, to an electrode tip of a consumable electrode configured to advance toward a workpiece, a pulsed current waveform having repetitive cycles to strike an arc on the workpiece during each cycle, wherein a cycle of the repetitive cycles includes:

a forming period that includes a forming pulse to form a droplet at the electrode tip, wherein the forming pulse includes a first peak that has a first peak duration; and a detachment period that includes a detachment pulse separated from the forming pulse and configured to transfer the droplet from the electrode tip to the workpiece, wherein the detachment pulse includes a second peak that has a second peak duration that is less than the first peak duration, wherein the controller is configured to control the forming pulse and the detachment pulse such that an equal energy level is delivered to the electrode tip by each of the forming pulse and the detachment pulse in the cycle.

13. The welding system of claim 12, wherein:

the first peak has a first peak level and the second peak has a second peak level that is greater than the first peak level.

14. The welding system of claim 12, wherein the forming period further includes:

a first inter-pulse segment between the forming pulse and the detachment pulse, wherein the first inter-pulse segment has a first inter-pulse level that is less than each of a first peak level of the forming pulse and a second peak level of the detachment pulse.

15. The welding system of claim 14, wherein:

the first inter-pulse level is a background level.

16. The welding system of claim 14, wherein:

the first inter-pulse level is greater than a background level.

17. The welding system of claim 14, wherein the detachment period includes:

a second inter-pulse segment following the detachment pulse and that has a second inter-pulse level that is less than both the first peak level and the second peak level.

18. The welding system of claim 17, wherein:

the first inter-pulse level and the second inter-pulse level differ from each other.

* * * * *